United States Patent
Vandikas et al.

(10) Patent No.: US 12,003,978 B2
(45) Date of Patent: Jun. 4, 2024

(54) METHOD AND APPARATUS FOR NETWORK RESOURCE ALLOCATION

(71) Applicant: Telefonaktiebolaget LM Ericsson (publ), Stockholm (SE)

(72) Inventors: Konstantinos Vandikas, Solna (SE); Rafia Inam, Västerås (SE); Athanasios Karapantelakis, Solna (SE); Adam Bergkvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 436 days.

(21) Appl. No.: 17/312,524

(22) PCT Filed: Dec. 10, 2018

(86) PCT No.: PCT/EP2018/084117
§ 371 (c)(1),
(2) Date: Jun. 10, 2021

(87) PCT Pub. No.: WO2020/119876
PCT Pub. Date: Jun. 18, 2020

(65) Prior Publication Data
US 2022/0053344 A1    Feb. 17, 2022

(51) Int. Cl.
*H04W 4/00* (2018.01)
*H04W 24/02* (2009.01)
(Continued)

(52) U.S. Cl.
CPC .......... *H04W 24/02* (2013.01); *H04W 28/12* (2013.01); *H04W 68/005* (2013.01)

(58) Field of Classification Search
CPC ............................... H04W 24/02; H04W 28/12
See application file for complete search history.

(56) References Cited

U.S. PATENT DOCUMENTS

2007/0106796 A1* 5/2007 Kudo .................. H04L 67/1008
                                                              709/226
2008/0177790 A1* 7/2008 Honwad ................ G06Q 10/10
(Continued)

OTHER PUBLICATIONS

Author Unknown, "3rd Generation Partnership Project; Technical Specification Group Services and System Aspects; Network sharing; Architecture and Functional Description (Release 6)," 3GPP TR 23.851 V6.1.0, Jun. 2004, 3GPP Organizational Partners, 30 pages.
(Continued)

*Primary Examiner* — Elisabeth Benoit Magloire
(74) *Attorney, Agent, or Firm* — Withrow & Terranova, PLLC

(57) ABSTRACT

A method for managing allocation of network resources at a site in a communication network is disclosed. The method is performed by a resource manager and comprises receiving a notification of an event occurring at a network entity, the network entity being associated with the site and with a network operator. The event comprises at least one of a performance event, a fault event or an update event. The method further comprises determining an implication of the notified event for traffic flow in the network and determining, on the basis of the implication of the notified event for traffic flow in the network, an operational requirement to compensate for the event. The method further comprises obtaining configuration information for fulfilment of the operational requirement and instructing an infrastructure manager for the site to allocate network resources in accordance with the obtained configuration information in order to satisfy the operational requirement.

17 Claims, 10 Drawing Sheets

(51) Int. Cl.
*H04W 28/12* (2009.01)
*H04W 68/00* (2009.01)

(56) References Cited

U.S. PATENT DOCUMENTS

| | | | | |
|---|---|---|---|---|
| 2014/0031049 A1* | 1/2014 | Sundaresan | ........... | H04W 24/02 |
| | | | | 455/446 |
| 2014/0328178 A1* | 11/2014 | Haberland | ........... | H04W 28/16 |
| | | | | 370/235 |
| 2015/0271681 A1 | 9/2015 | Pérez et al. | | |
| 2016/0044702 A1 | 2/2016 | Centonza et al. | | |
| 2016/0366009 A1 | 12/2016 | Bedekar et al. | | |
| 2017/0164215 A1* | 6/2017 | Chen | ..................... | H04W 24/02 |
| 2017/0214624 A1* | 7/2017 | Grob-Lipski | ....... | H04L 67/1008 |
| 2017/0311183 A1 | 10/2017 | Cotanis | | |
| 2018/0063847 A1* | 3/2018 | Huang | .................. | H04W 28/16 |
| 2018/0227909 A1 | 8/2018 | Tarlazzi | | |
| 2019/0098520 A1* | 3/2019 | Kim | ...................... | H04B 7/0404 |
| 2019/0102715 A1* | 4/2019 | Sarir | ...................... | G06F 9/5077 |
| 2019/0150213 A1* | 5/2019 | Kim | ........................ | H04L 41/08 |
| | | | | 370/254 |
| 2020/0100137 A1* | 3/2020 | Panchal | ................ | H04W 48/18 |

OTHER PUBLICATIONS

International Search Report and Written Opinion for International Patent Application No. PCT/EP2018/084117, dated Jun. 26, 2019, 17 pages.

* cited by examiner

METHOD AND APPARATUS FOR NETWORK RESOURCE ALLOCATION

This application is a 35 U.S.C. § 371 national phase filing of International Application No. PCT/EP2018/084117, filed Dec. 10, 2018, the disclosure of which is incorporated herein by reference in its entirety.

TECHNICAL FIELD

The present disclosure relates to a method for managing allocation of network resources at a site in a communication network. The present disclosure also relates to a resource manager and to a computer program and a computer program product configured, when run on a computer to carry out a method for managing allocation of network resources at a site in a communication network.

BACKGROUND

Practices for the sharing of physical or virtual resources between operators in a telecommunication network are well established. Two main techniques are currently employed for the sharing of physical resources, which may be divided into spectrum resources and other physical resources. Sharing of spectrum resources, in the form of spectrum pooling, is defined in 3GPP REL6 TR 23.851, according to which operators are allowed to share parts of the available spectrum. Typically, this sharing is achieved by having individual cells broadcast their spectrum usage and other relevant information (including for example their network mode of operation). Depending upon spectrum use and individual policies for spectrum pooling, a first operator may authorise a second operator to make use of spectrum which is allocated to the first operator but which the first operator is not currently using. This form of physical resource sharing has the advantage of being dynamically configurable, and so reactive to changing network conditions. However, the broadcasting of spectrum usage and other relevant information introduces additional signalling load on valuable radio resources.

Sharing of physical network resources such as antennas, Radio Access Networks (RAN) and Radio Core Network, is also a well-known practice among mobile network operators, which has been taking place since early 2000. This kind of resource sharing is typically static and applied in situations in which, owing to different regulations, operators need to share resources in order to deliver their services to customers. Some examples of this type of sharing include Multi operator RAN, Multi operator core network and others. Owing to the regulatory nature of this type of physical resource sharing, it is static and unable to react to evolving network requirements.

Virtual resources such as CPU and memory can be shared efficiently and dynamically in cloud-based infrastructures. However, cloud-based infrastructures are typically owned by a single entity, and while they are capable of allocation of resources remotely to virtually any cluster, those clusters are still owned by the same entity, although they may be operated by a third party. This restriction to resource sharing within the confines of a single resource owner can limit the opportunities for resource sharing to be used to address network issues, particularly in multi-vendor, heterogeneous network environments.

SUMMARY

It is an aim of the present disclosure to provide a method, apparatus and computer readable medium which at least partially address one or more of the challenges discussed above.

According to a first aspect of the present disclosure, there is provided a method for managing allocation of network resources at a site in a communication network. The method is performed by a resource manager and comprises receiving a notification of an event occurring at a network entity, the network entity being associated with the site and with a network operator. The event comprises at least one of a performance event, a fault event or an update event. The method further comprises determining an implication of the notified event for traffic flow in the network and determining, on the basis of the implication of the notified event for traffic flow in the network, an operational requirement to compensate for the event. The method further comprises obtaining configuration information for fulfilment of the operational requirement and instructing an infrastructure manager for the site to allocate network resources in accordance with the obtained configuration information in order to satisfy the operational requirement.

According to examples of the present disclosure, a performance event may comprise an occurrence in which a parameter measuring some aspect of network performance attains or surpasses a threshold value. The parameter may for example be a Key Performance Indicator (KPI), and may be associated with upper and/or lower thresholds which indicate acceptable performance. A value of the KPI reaching or surpassing such a threshold may comprise a performance event, resulting in a notification of the event being generated. A fault event may comprise any network happening relating to an occurrence of a fault within the network. An update event may be a scheduled or emergency update of any part of the software or hardware associated with a network entity. An update event may involve a certain amount of downtime for the network entity, during which the network entity will be partially or totally unavailable to perform its function, while the update is carried out. According to examples of the present disclosure, the notification of an event may be received from a Network Operations Centre (NOC), and may for example be received via a NOC endpoint.

According to examples of the present disclosure, the network resources allocated according to the method may belong to the network operator associated with the entity at which the event occurred or may belong to a different network operator. A network operator associated with a network entity may comprise a network operator having partial or total managerial responsibility for the entity and/or a network operator having ownership of the network entity or the resources upon which the network entity is running. A network entity may be associated with a site in that it is located at or hosted at the site. In other examples, a network entity may be associated with a site in that it processes in some manner traffic originating at or traversing the site. In still further examples, a network entity may be associated with a site in that it performs some function that is used by an entity that is located at or hosted at the site. In still further examples, a network entity may be associated with a site in that is behaving in a similar manner to one or more network entities located or hosted at the site, or processing traffic originating at or traversing the site. Behaving in a similar manner may comprise producing alarms or other events in a similar pattern over time.

According to examples of the present disclosure, the implication for traffic flow may vary according to the nature of the notified event. For example, a performance event of a KPI for a node falling below a threshold value may imply that traffic flow through the node is less than expected. A fault event of a failed node or link may imply that traffic flow through peer nodes and/or links will increase, as recovery procedures reroute traffic around the failed node or link. Implication for traffic flow may therefore be expressed as a difference between current and expected or current and future traffic volume and/or routing. According to examples of the present disclosure, an operational requirement to compensate for the event may comprise an operational requirement that will enable the network to continue to function adequately under the traffic flow conditions following the event. This may comprise allocating resources in such a manner as to accommodate the changed traffic flow conditions following the event.

According to examples of the present disclosure, the method may further comprise, on receipt of confirmation from the infrastructure manager that at least a part of the instructed resources have been allocated, updating a distributed record of network resource allocation with the allocated resources.

According to examples of the present disclosure, the updating of a distributed record of network resource allocation may ensure a degree of transparency for network operators in the allocation process, creating a record of resource allocations that may be accessible to all parties and so may be used for billing purposes or to check that existing agreements have been complied with etc.

According to examples of the present disclosure, the resource allocation that is carried out by the infrastructure manager may not fully correspond to the resource allocation to satisfy the operational requirement that was instructed according to the method of the present disclosure. In different examples of the present disclosure, some, all or none of the resources may be allocated as instructed, according to the constraints and operational priorities applied at the infrastructure manager.

According to examples of the present disclosure, instructing an infrastructure manager for the site to allocate network resources in accordance with the obtained configuration information in order to satisfy the operational requirement may comprise instructing the infrastructure manager to make a temporary allocation of network resources.

According to examples of the present disclosure, determining, on the basis of the implication of the notified event for traffic flow in the network, an operational requirement to compensate for the event may comprise determining a change in physical or virtual network configuration to optimise network performance under traffic flow conditions following the notified event.

According to examples of the present disclosure, the change in physical or virtual network configuration may comprise allocation or reallocation of physical or virtual functions to different network nodes or to different network operators. The change in network configuration may additionally or alternatively comprise allocation or reallocation of raw network resources such as compute, storage, throughput and latency. The change in network configuration may additionally or alternatively comprise an abstracted level of resources, such as network subscribers served by a particular network entity, or a proportion of the functionality of a network entity. According to examples of the present disclosure, optimising network performance under traffic flow conditions following the notified event may comprise ensuring that network resources are in place to handle the new traffic flow conditions. This may comprise replacing resources that have become temporarily unavailable as a consequence of the notified event, or changing resource allocations to reflect the new load on various network elements under the new traffic flow conditions.

According to examples of the present disclosure, the change in physical or virtual network configuration to optimise network performance under traffic flow conditions following the notified event may comprise a physical or virtual network function to be allocated to the operator associated with the network entity at which the event occurred. According to such examples, the method may further comprise obtaining instructions for configuration of the network function from an operator specific repository.

According to examples of the present disclosure, the instructions for configuration of the network function may comprise a blueprint for the network function, for example in the case of a virtual network function, or they may comprise instructions for the configuration of a physical entity performing the function.

According to examples of the present disclosure, instructing an infrastructure manager for the site to allocate network resources in accordance with the obtained configuration information in order to satisfy the operational requirement may comprise including the obtained instructions for configuration with the instruction to the infrastructure manager.

According to examples of the present disclosure, obtaining configuration information for fulfilment of the operational requirement may comprise querying a site configuration repository for site configuration information applicable to the operational requirement.

According to examples of the present disclosure, the network may comprise a plurality of site configuration repositories and the method may comprise querying a site configuration repository containing information for the network operator associated with the entity at which the notified network event occurred.

According to examples of the present disclosure, the configuration information for fulfilment of the operational requirement may comprise at least one of site configuration information, backhaul information, operation and maintenance information, hardware configuration and/or information on pre-approved resource sharing between network operators.

According to examples of the present disclosure, information on pre-approved resource sharing between network operators may comprise any indication of existing agreements between operators regarding the sharing of resources. Such information may range from a simple identification of operators with which some kind of resource sharing agreement exists to a more detailed indication of resource identification and resource volumes which may be shared from which operators. Such information may also provide pointers to functions which may provide changing information for such agreements, including for example BSS/OSS systems.

According to examples of the present disclosure, the operational requirement may comprise a physical or virtual network function to be allocated to the operator associated with the network entity at which the event occurred, and instructing an infrastructure manager for the site to allocate network resources in accordance with the obtained configuration information in order to satisfy the operational requirement may comprise instructing the infrastructure manager to perform at least one of re-allocating an existing instance of the function to the network operator and/or deploying a new instance of the function to the network operator.

According to examples of the present disclosure, reallocating may comprise reconfiguring in accordance with the configuration information. For example a function instance that was previously allocated to a different network operator may need to be re-configured in accordance with the obtained configuration information relevant to the operator associated with the network entity at which the event occurred.

According to examples of the present disclosure, the infrastructure manager may comprise at least one of an Infrastructure as a Service (IAAS) platform and/or a physical resource orchestration function.

According to examples of the present disclosure, the physical resource orchestration function may then send a request directly to the resource to be reallocated. The resource may be running some basic software which may be updated with any additional software and/or configuration information supplied by or via the orchestration function.

According to examples of the present disclosure, the distributed record of network resource allocation may comprise a distributed persistent data structure. Examples of a distributed persistent data structure may include a Distributed Ledger, Distributed Hash Table, and/or a relational or document database. In some examples, the distributed data structure may be stored in a database and the database may be of a type including Distributed Ledger, Hash Table, relational or document database.

According to examples of the present disclosure, the method may further comprise receiving a notification that the event is no longer occurring at the network entity, and instructing the infrastructure manager to reverse the allocation of network resources, returning the allocated network resources to their allocation immediately preceding the previous instruction from the resource manager.

According to examples of the present disclosure, instructing the infrastructure manager to reverse the allocation of network resources may comprise reading the allocation of resources from the distributed record of network resource allocation.

According to examples of the present disclosure, the method may further comprise updating the distributed record of network resource allocation to state that the resource allocation has been reversed.

According to examples of the present disclosure, the method may further comprise, on receipt of confirmation from the infrastructure manager that at least a part of the instructed resources have been allocated, updating a distributed record of network resource allocation with a reverse procedure for the allocated resources, and instructing the infrastructure manager to reverse the allocation of network resources may comprise reading the reverse procedure from the distributed record of network resource allocation.

According to examples of the present disclosure, the method may further comprise querying the distributed record of network resource allocation for a resource sharing policy corresponding to the determined operational requirement, wherein a resource sharing policy comprises an identification of network operators offering and receiving shared resources, an identification of resources shared and a specification of a volume of resources shared.

According to examples of the present disclosure, querying the distributed record of network resource allocation for a resource sharing policy corresponding to the determined operational requirement may comprise sending a policy request to the distributed record of network resource allocation, the policy request including at least one of an event identifier of the notified event, an operator identifier of the operator associated with the network entity at which the event occurred, and/or a reallocation identifier corresponding to the specific operational requirement According to examples of the present disclosure, the resource manager may generate the reallocation ID, which may comprise a one-time unique identifier for the specific allocation or reallocation of resources that is to take place in order to fulfil the determined operational requirement.

According to examples of the present disclosure, in the absence of a policy corresponding to the reallocation ID, the distributed record may use one or both of the event ID and/or operator ID to identify an appropriate policy for the operational requirement. In the event of multiple policies corresponding to the event ID, the distributed record may return the most recent policy.

According to examples of the present disclosure, if the distributed record of network resource allocation returns a policy, instructing an infrastructure manager for the site to allocate network resources in accordance with the obtained configuration information in order to satisfy the operational requirement may comprise instructing the infrastructure manager to allocate network resources in accordance with the policy.

According to examples of the present disclosure, the method may further comprise updating a policy record on the distributed record of network resource allocation with a policy comprising the allocated resources and identifiers of the operators offering and receiving the allocated resources. According to examples of the present disclosure, the policy may also contain payment details for the resource allocation.

According to examples of the present disclosure, updating the policy record may comprise updating an existing policy for the event that occurred, or may comprise creating a new policy, for example if no policy exists for the event that has occurred or if the instructed allocation of resources differs from an existing policy, either in the nature or amount of resources allocated or the operator offering or receiving the resources.

According to another aspect of the present disclosure, there is provided a computer program comprising instructions which, when executed on at least one processor, cause the at least one processor to carry out a method according to any one of the preceding claims.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a resource manager for managing allocation of network resources at a site in a communication network. The resource manager comprises a processor and a memory, the memory containing instructions executable by the processor such that the resource manager is operable to receive a notification of an event occurring at a network entity, the network entity being associated with the site and with a network operator, wherein the event comprises at least one of a performance event, a fault event or an update event. The resource manager is further operable to determine an implication of the notified event for traffic flow in the network determine, on the basis of the implication of the notified event for traffic flow in the network, an operational requirement to compensate for the event and obtain configuration information for fulfilment of the operational requirement. The resource manager is further operable to instruct an infrastructure manager for the site to allocate network resources in accordance with the obtained configuration information in order to satisfy the operational requirement.

According to examples of the present disclosure, the resource manager is further operable to carry out a method according to any one of the preceding aspects or examples of the present disclosure.

According to another aspect of the present disclosure, there is provided a resource manager for managing allocation of network resources at a site in a communication network. The resource manager is adapted to receive a notification of an event occurring at a network entity, the network entity being associated with the site and with a network operator, wherein the event comprises at least one of a performance event, a fault event or an update event. The resource manager is further adapted to determine an implication of the notified event for traffic flow in the network, determine, on the basis of the implication of the notified event for traffic flow in the network, an operational requirement to compensate for the event, and obtain configuration information for fulfilment of the operational requirement. The resource manager is further adapted to instruct an infrastructure manager for the site to allocate network resources in accordance with the obtained configuration information in order to satisfy the operational requirement.

According to examples of the present disclosure, the resource manager is further adapted to carry out a method according to any one of the preceding aspects or examples of the present disclosure.

DETAILED DESCRIPTION

Aspects of the present disclosure provide a method and resource manager that allow for the efficient sharing of physical and/or virtual network resources. Such resources may be shared for example in the event of a fault, failure or other network event which may render some resources or functionality temporarily unavailable. The resources being shared may have different physical owners, and may be allocated to a particular operator or function to address an operational requirement generated by a network event as discussed above. The resource allocation may be temporary, allowing for the sharing of resources while an underlying issue is resolved. To provide transparency in the allocation process, some examples of the present disclosure propose the use of a distributed record of network resource allocation, so creating a record of resource allocations that may be accessible to all parties and may be used for billing purposes or to check that existing agreements have been complied with etc.

Figure 1:
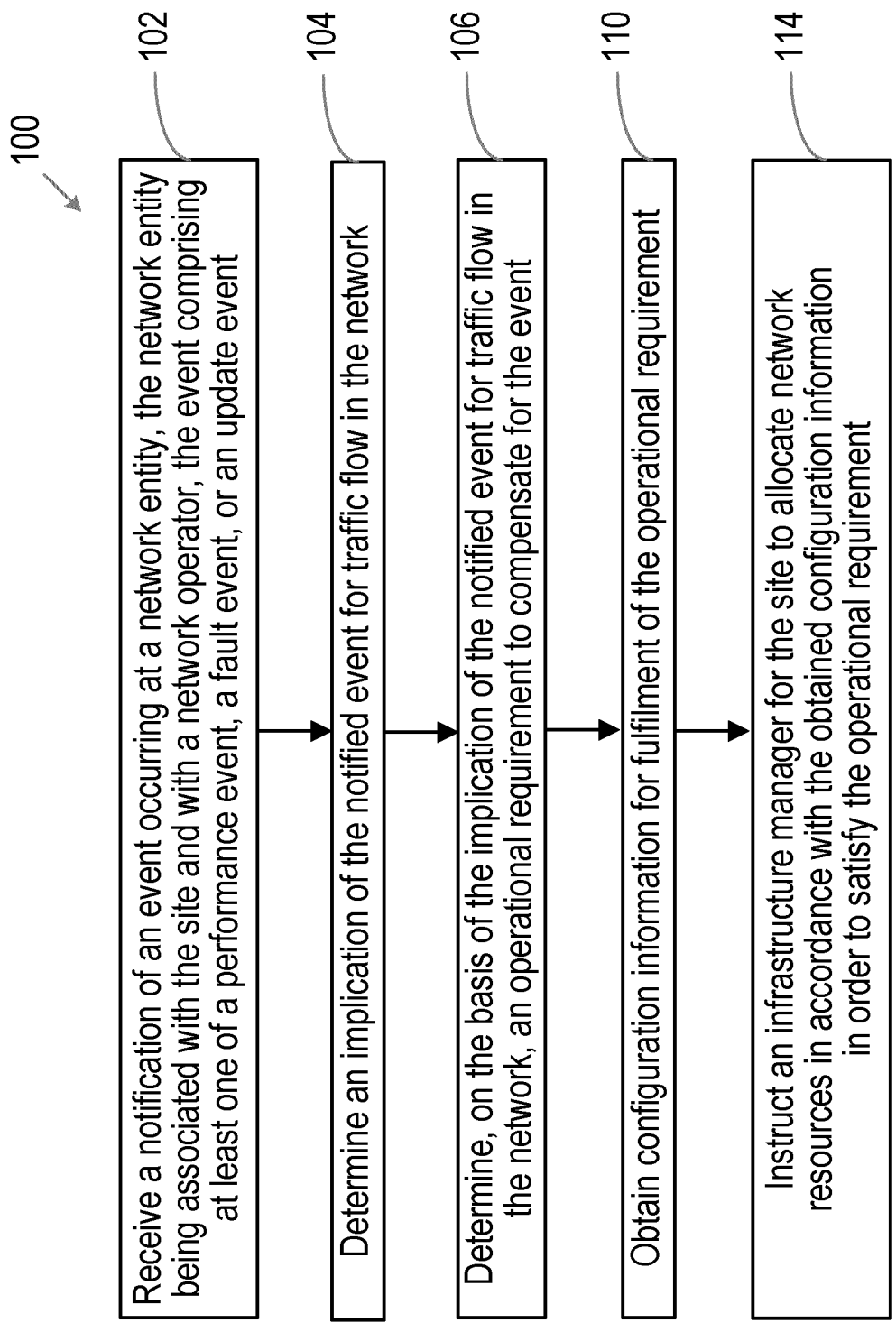
FIG. 1 is a flow chart illustrating process steps in a method for managing allocation of resources at a site in a communication network.

FIG. 1 is a flow chart illustrating process steps in a method 100 for managing allocation of network resources at a site in a communication network in accordance with an aspect of the present disclosure. The communication network may be any kind of communication network, including for example a 3GPP network, an Internet of Things (IoT) network, a Local, Metropolitan or Wide Area network, etc. The method is performed by a resource manager, which may be a physical or virtual function and may be hosted at a site in a communication network or may be hosted in a localised or distributed cloud deployment. Referring to FIG. 1, in a first step 102, the method 100 comprises receiving a notification of an event occurring at a network entity, the network entity being associated with the site and with a network operator, the event comprising at least one of a performance event, a fault event or an update event. The method then comprises, in step 104, determining an implication of the notified event for traffic flow in the network, and, in step 106, determining, on the basis of the implication of the notified event for traffic flow in the network, an operational requirement to compensate for the event. In step 110, the method comprises obtaining configuration information for fulfilment of the operational requirement. Finally, in step 114, the method comprises instructing an infrastructure manager for the site to allocate network resources in accordance with the obtained configuration information in order to satisfy the operational requirement.

Figure 2A:
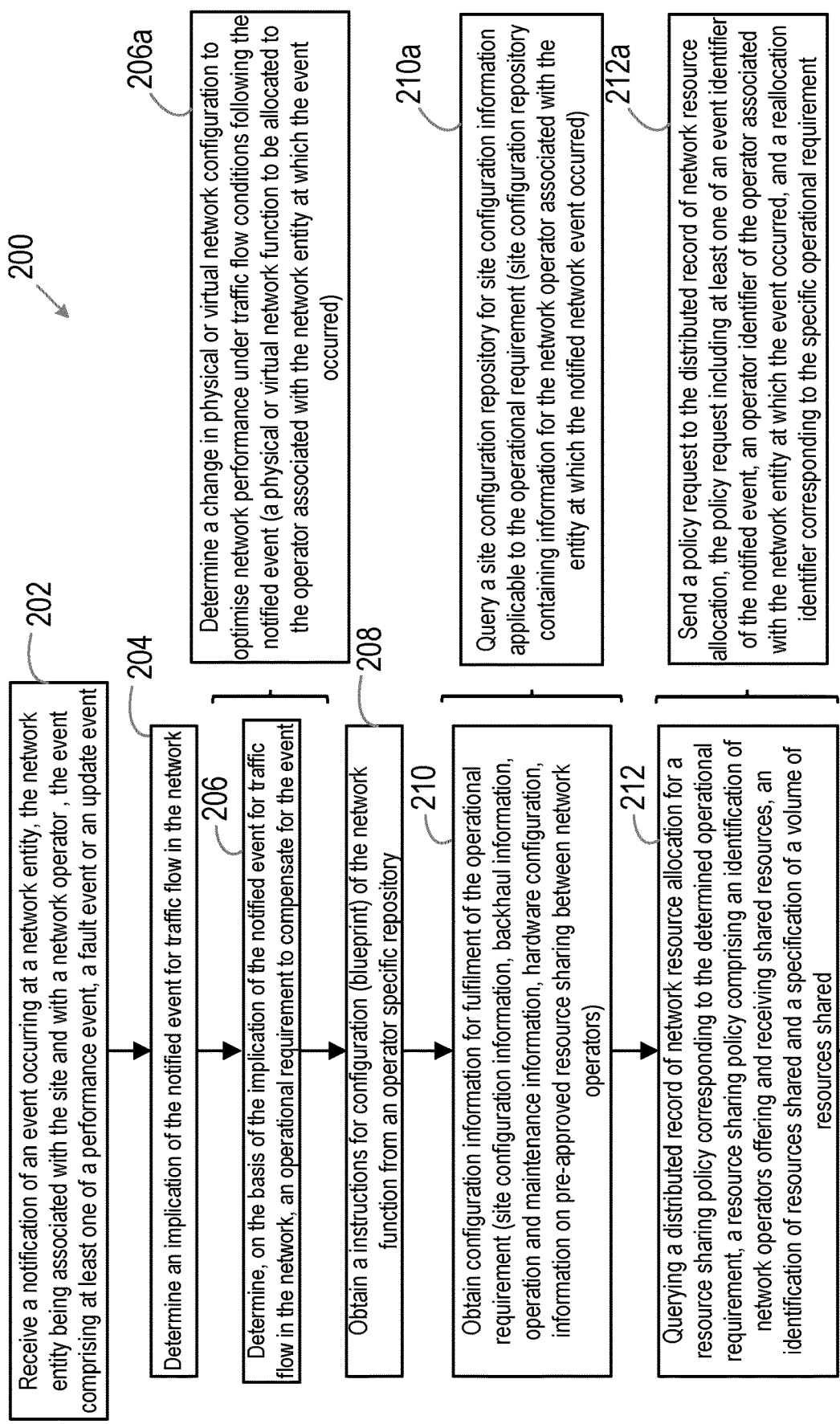
FIGS. 2a to 2c are flow charts illustrating process steps in another example of method for managing allocation of resources at a site in a communication network.
Figure 2B:
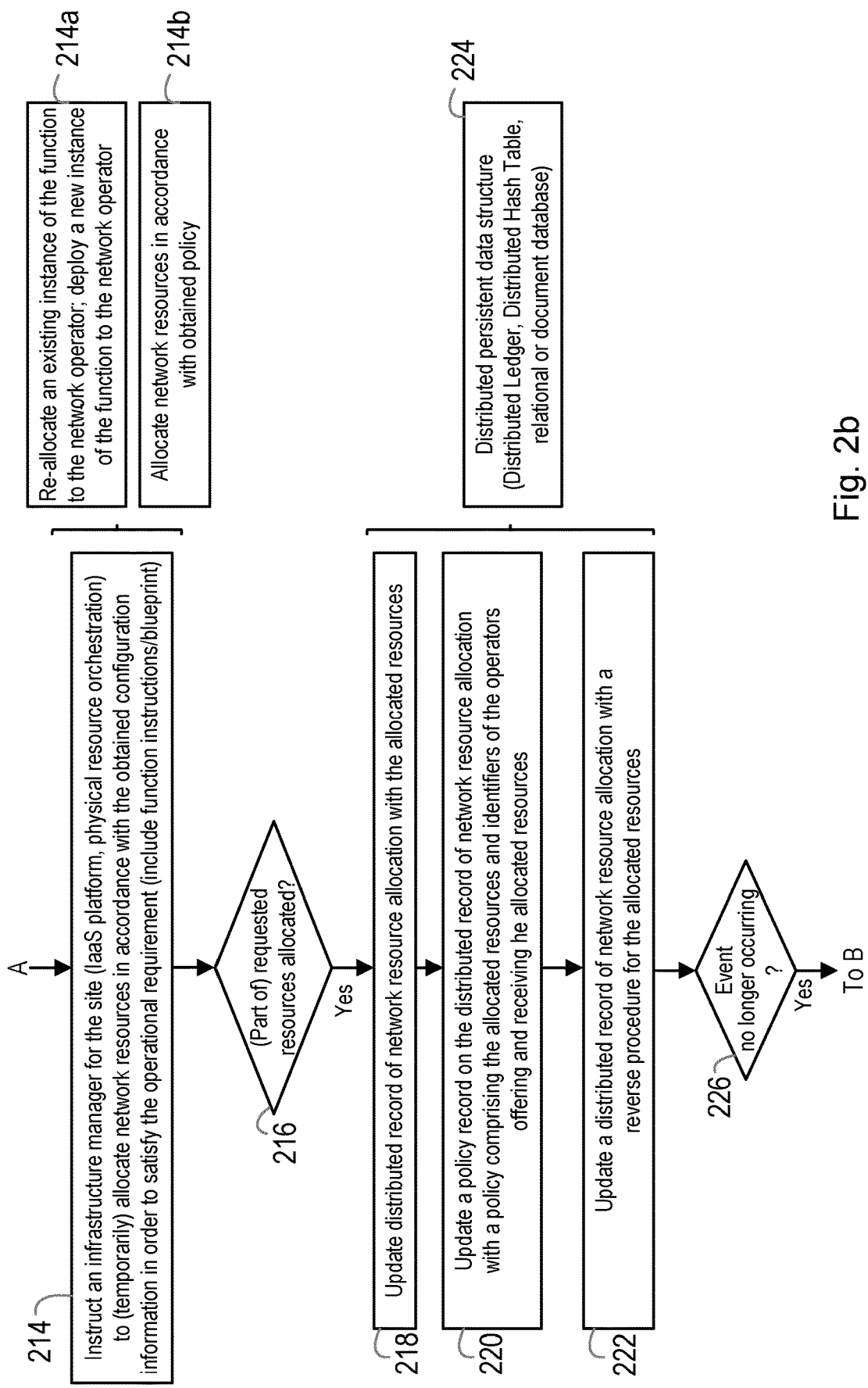
Figure 2C:
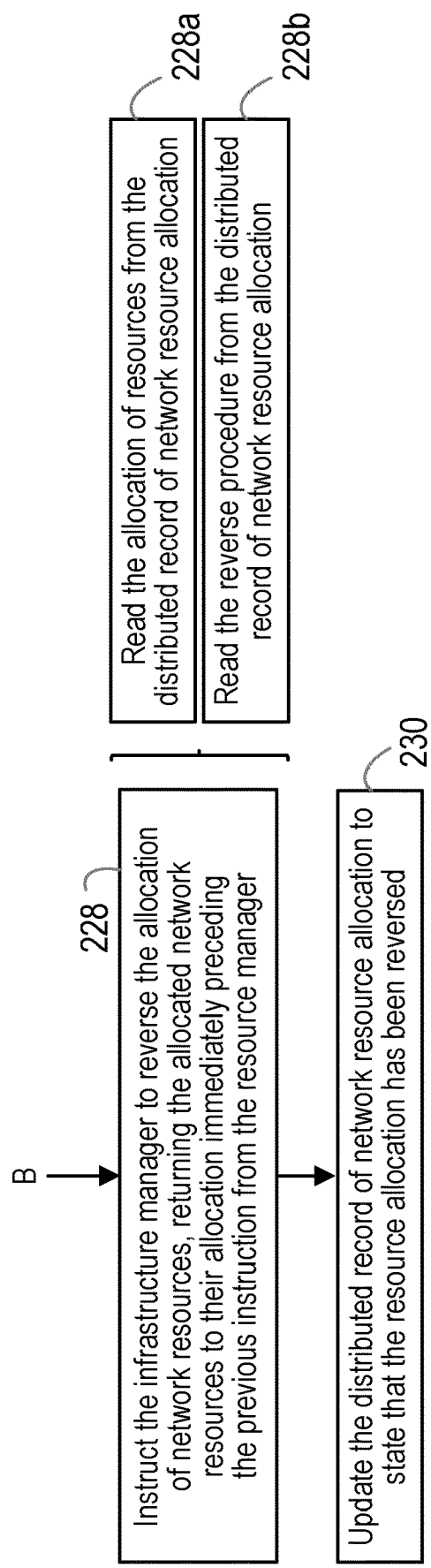

FIGS. 2a, 2b and 2c show a flow chart illustrating process steps in another example of a method 200 for managing allocation of network resources at a site in a communication network in accordance with aspects of the present disclosure. The steps of the method 200 illustrate one way in which the steps of the method 100 may be implemented and supplemented in order to achieve the above discussed and additional functionality. As for the method of FIG. 1 above, the communication network may be any kind of communication network, including for example a 3GPP network, an Internet of Things (IoT) network, a Local, Metropolitan or Wide Area network, etc. The method is performed by a resource manager, which may be a physical or virtual function and may be hosted at a site in a communication network or may be hosted in a localised or distributed cloud deployment.

Referring to FIG. 2a, in a first step 202, the resource manager receives a notification of an event occurring at a network entity, the network entity being associated with the site and with a network operator. The event comprises at least one of a performance event, a fault event and/or an update event. As discussed above, a performance event may comprise an occurrence in which a parameter measuring some aspect of network performance attains or surpasses a threshold value. The parameter may for example be a Key Performance Indicator (KPI), and may be associated with upper and/or lower thresholds which indicate acceptable performance. A value of the KPI reaching or surpassing such a threshold may comprise a performance event, resulting in a notification of the event being generated. A fault event may comprise any network happening relating to an occurrence of a fault within the network. An update event may be a scheduled or emergency update of any part of the software or hardware associated with a network entity. An update event may involve a certain amount of downtime for the network entity, during which the network entity will be partially or totally unavailable to perform its function, while the update is carried out.

The resource manager may receive the notification of an event from a Network Operations Centre (NOC), which may be one of several NOCs associated with the site. The notification may be received via a NOC endpoint. The NOC sending the notification may be an operator NOC, and thus may be the NOC operator associated with the entity at which the event occurred, or may be a third party NOC which is configured to receive reports of fault, performance or update events.

As discussed above, a network operator associated with a network entity may comprise a network operator having partial or total managerial responsibility for the entity and/or a network operator having ownership of the network entity or the resources upon which the network entity is running. A network entity may be associated with a site in that it is located at or hosted at the site. In other examples, a network entity may be associated with a site in that it processes in some manner traffic originating at or traversing the site. In still further examples, a network entity may be associated with a site in that it performs some function that is used by an entity that is located at or hosted at the site.

Referring again to FIG. 2a, at step 204, the resource manager determines an implication of the notified event for traffic flow in the network. The implication for traffic flow may vary according to the nature of the notified event. For example, a performance event of a KPI for a node falling below a threshold value may imply that traffic flow through the node is less than expected. A fault event of a failed node or link may imply that traffic flow through peer nodes and/or links will increase, as recovery procedures reroute traffic around the failed node or link. Implication for traffic flow may therefore be expressed as a difference between current and expected or current and future traffic volume and/or routing.

Having determined an implication of the notified event for traffic flow in the network, the resource manager then determines, on the basis of this implication, an operational requirement to compensate for the event in step 206. An operational requirement to compensate for the event may comprise an operational requirement that will enable the network to continue to function adequately under the traffic flow conditions following the event. This may comprise allocating resources in such a manner as to accommodate the changed traffic flow conditions following the event. As illustrated in step 206a, determining an operational requirement comprises, in the illustrated example, determining a change in physical or virtual network configuration to optimise network performance under traffic flow conditions following the notified event. In one example of the present disclosure, optimising network performance under traffic flow conditions following the notified event may comprise ensuring that network resources are in place to handle the new traffic flow conditions. This may comprise replacing resources that have become temporarily unavailable as a consequence of the notified event, or changing resource allocations to reflect the new load on various network elements under the new traffic flow conditions.

The change in physical or virtual network configuration may for example comprise allocation or reallocation of physical or virtual functions to different network nodes or to different network operators. The change in network configuration may additionally or alternatively comprise allocation or reallocation of raw network resources such as compute, storage, throughput and latency. The change in network configuration may additionally or alternatively comprise an abstracted level of resources, such as network subscribers served by a particular network entity, or a proportion of the functionality of a network entity.

Referring still to FIG. 2a, and considering an example in which the operational requirement comprises a physical or virtual network function to be allocated to the operator associated with the network entity at which the event occurred, the resource manager then obtains, in step 208, instructions for configuration of the network function from an operator specific repository. In the example of a virtual network function, the instructions for configuration of the network function may comprise a blueprint for the network function. Alternatively or in addition, the instructions may comprise instructions for the configuration of a physical entity performing the function.

The resource manager then obtains, at step 210, configuration information for fulfilment of the operational requirement. The precise nature of the configuration information is likely to depend upon the particular operational requirement, but examples of configuration information may include site configuration information, backhaul information, operation and maintenance information, hardware configuration and/or information on pre-approved resource sharing between network operators. Information on pre-approved resource sharing between network operators may comprise any indication of existing agreements between operators regarding the sharing of resources. Such information may range from a simple identification of operators with which some kind of resource sharing agreement exists to a more detailed indication of resource identification and resource volumes which may be shared from which operators. Such information may also provide pointers to functions which may provide changing information for such agreements, including for example BSS/OSS systems. The configuration information obtained at step 210 may allow for the configuration of resources to be allocated in accordance with the existing configuration of the site and of a particular network operator's organisation.

As illustrated at 210a, the configuration information is obtained, in the illustrated example, by querying a site configuration repository for site configuration information applicable to the operational requirement. It will be appreciated that a network may comprise a plurality of site configuration repositories, including for example an operator specific repository for each operator present at the site. The resource manager may direct the query to a site configuration repository containing information for the network operator associated with the entity at which the notified network event occurred, as it is this operator that will need an additional allocation of resources in order to manage the impact of the notified event.

In step 212, the resource manager queries a distributed record of network resource allocation for a resource sharing policy corresponding to the determined operational requirement. The distributed record of network resource allocation may comprise a distributed persistent data structure, examples of which include a Distributed Ledger, Distributed Hash Table, and/or a relational or document database, as illustrated at 224 in FIG. 2b. The distributed record of network resource allocation may be accessible to some or all network operators present at the site as well as to the resource manager. The distributed record of network resource allocation is discussed in greater detail below with reference to FIGS. 2b and 3. A resource sharing policy comprises an identification of network operators offering and receiving shared resources, an identification of resources shared and a specification of a volume of resources shared. As illustrated in 212a, querying the distributed record of network resource allocation for a resource sharing policy corresponding to the determined operational requirement may comprise sending a policy request to the distributed record of network resource allocation, the policy request including at least one of an event identifier of the notified event, an operator identifier of the operator associated with the network entity at which the event occurred, and/or a reallocation identifier corresponding to the specific operational requirement. The reallocation identifier may be generated by the resource manager and may comprise a one-time unique identifier for the specific allocation or reallocation of resources that is to take place in order to fulfil the determined operational requirement. If a policy corresponding to the reallocation identifier exists in the distributed record of network resource allocation, this policy is returned to the resource manager in response to the query. In the absence of a policy corresponding to the reallocation ID, the distributed record may use one or both of the event ID and/or operator ID to identify an appropriate policy for the operational requirement. In the event of multiple policies corresponding to the event ID, the distributed record may return the most recent policy.

Referring now to FIG. 2b, the resource manager then instructs an infrastructure manager for the site to allocate network resources in accordance with the obtained configuration information in order to satisfy the operational requirement. The network resources allocated according to the method may belong to the network operator associated with the entity at which the event occurred or may belong to a different network operator. The allocation may in many examples comprise a temporary allocation, which will last until the network event is resolved and the traffic flow can return to conditions before the event occurred. The instruction to the infrastructure manager may comprise the configuration information obtained at step 210 and may also comprise the instructions, such as a blueprint, obtained at step 206. If a policy was returned following the query of step 212, then the resource manager may instruct the infrastructure manager to allocate resources in accordance with the policy, and may include the policy in the instruction to the infrastructure manager.

The nature of the infrastructure manager may depend upon the nature of the resources to be allocated. In the example of virtual resources, the infrastructure manager may comprise an Infrastructure as a Service (IAAS) platform. In the example of physical resources, the infrastructure manager may comprise a physical resource orchestration function. An IaaS platform may be in a position to directly allocate the resources as part of its standard functioning. A physical resource orchestration function may send a request to the resource to be reallocated. The resource may be running some basic software which may be updated with any additional software and/or configuration information supplied by or via the orchestration function.

As illustrated at steps 214a and 214b, instructing the infrastructure manager to allocate network resources may comprise instructing the infrastructure manager to perform at least one of re-allocating an existing instance of a function to the network operator and/or deploying a new instance of a function to the network operator. Reallocating may comprise reconfiguring in accordance with the configuration information. For example a function instance that was previously allocated to a different network operator may need to be re-configured in accordance with the obtained configuration information relevant to the operator associated with the network entity at which the event occurred.

Figure 3:
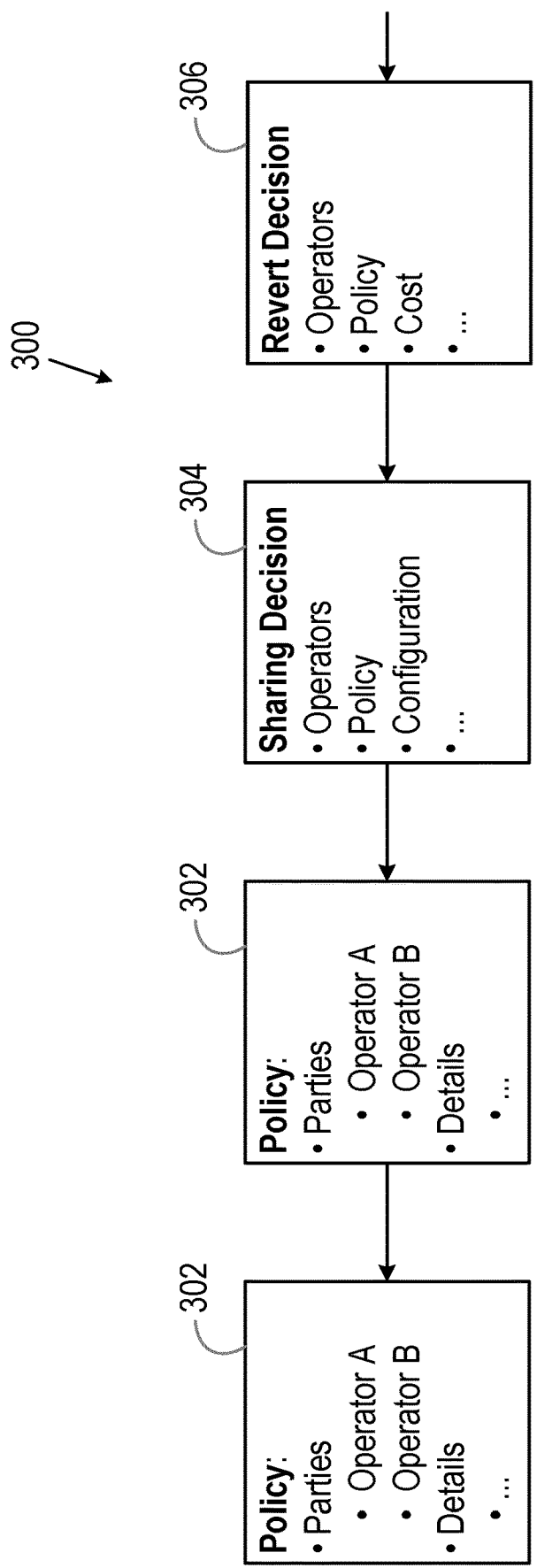
FIG. 3 is a block diagram illustrating an example distributed record.

On receipt of confirmation from the infrastructure manager at step 216 that at least a part of the instructed resources has been allocated, the resource manager updates the distributed record of network resource allocation with the allocated resources in step 218. The resource manager may update the distributed record with the operators providing and receiving resources according to the allocation, the identifier of a policy according to which the allocation is made (if applicable), configuration information for the allocation and/or pricing information. Additional details of the allocation may also be included in the updating of the distributed record. As illustrated in FIG. 3, this update may be stored as a "Sharing Decision" 304 of an example distributed record of network resource allocation decisions in the form of a Distributed Ledger. By updating details of the resource allocation in the distributed record, the resource manager may ensure a degree of transparency for network operators in the allocation process, creating a record of resource allocations that may be accessible to all parties and so may be used for billing purposes or to check that existing agreements have been complied with etc. It will be appreciated that the resource allocation that is carried out by the infrastructure manager may not fully correspond to the resource allocation to satisfy the operational requirement that was instructed in step 214. Some, all or none of the resources may be allocated as instructed, according to the constraints and operational priorities applied at the infrastructure manager.

The resource manager additionally updates a policy record on the distributed record of network resource allocation with a policy at step 220. The policy comprises the allocated resources and identifiers of the operators offering and receiving the allocated resources. The policy may also contain payment details for the resource allocation. In some examples, updating the policy record may comprise updating an existing policy for the event that occurred, or may comprise creating a new policy, for example if no policy exists for the event that has occurred or if the instructed allocation of resources differs from an existing policy, either in the nature or amount of resources allocated or the operator offering or receiving the resources.

In step 222, the resource manager may update the distributed record of network resource allocation with a reverse procedure for the allocated resources. In other examples, the "sharing decision" record of the allocation or the policy may provide sufficient information for the resource allocation to be reversed at a later time.

In step 226 the resource manager checks for receipt of a notification that the event notified in step 202 is no longer occurring. This may indicate that a fault has been resolved and the affected resources are back online, or that an update has been carried out, or that a KPI or other indicator has returned to normal levels, for example following an intervention to address an underlying problem or as traffic patterns return to normal following an exceptional event in the vicinity of the site. Referring now to FIG. 2c, on receipt of such a notification, the resource manager instructs the infrastructure manager to reverse the allocation of network resources in step 228, returning the allocated network resources to their allocation immediately preceding the previous instruction from the resource manager. As illustrated in steps 228a and 228b, this may comprise reading the allocation of resources from the distributed record of network resource allocation and/or reading the reverse procedure from the distributed record of network resource allocation (if this was updated in step 222). The resource manager then updates the distributed record of network resource allocation to state that the resource allocation has been reversed, and hence the present "sharing decision" is terminated.

The above discussion of methods 100 and 200 refers to components including a site configuration repository and a distributed record of network resource allocation. These components are discussed in further detail below.

A site configuration repository holds site-specific configuration information, and in many examples with be operator specific, with each operator having a dedicated site configuration repository. In some examples one repository may contain information for more than one operator, for example if the repository is hosted and/or managed by a third party. The configuration information held in the site configuration repository is used during the reallocation process to enable the correct configuration of resources to satisfy the operational requirement determined by the resource manager. The information contained in the site configuration repository may include:

Site information such as geographical position of site, number of sectors, number of sectors per cell, as well as antenna type, frequency bands, mechanical tilt of the antenna, direction of beams, feeder cables attenuation and delays.

Transport ("backhaul") information such as type of backhaul network, differentiated services configuration (DSCP) for control signals.

Operation and maintenance information such as IP addresses for BBU remote access and node clock synchronization information using NTP protocol.

Pre-Approved Policy Sharing Information Between Operators Which May Not be Available in the Distributed Ledger The distributed record of network resource allocation records different allocations that may be managed by the resource manager, so allowing for these allocations to be reversed when appropriate, and providing a record that may be used for billing purposes or to check for compliance with resource sharing agreements etc. Different data structures may be envisaged for the distributed record, including, as discussed above, a Distributed Ledger, Distributed Hash Table, and/or a relational or document database. A distributed data structure that offers persistent storage, and is immutable by nature, may offer the advantage of providing a reliable record, ensuring that a record of an allocation that has taken place and been updated by the resource manager cannot later be manipulated.

FIG. 3 illustrates an example distributed record of network resource allocation in the form of a Distributed Ledger 300. The Distributed Ledger 300 includes a plurality of functional blocks as discussed below.

A policy block 302 comprises records of policies that have been uploaded to the Distributed Ledger 300. This block includes information about regulations governing resource sharing, and in particular which operators are allowed to share resources, as well as the type of resources to be shared and their volume. The "type" of resources may be "raw resources", in which case the "volume" is expressed in compute (e.g. number of virtual CPUs), store (e.g. number of gigabytes) and network (throughput and latency). In other examples, the "type" of resources may be expressed on a higher abstraction level, and could for example comprise a number of mobile subscribers or number of cells that can be shared between operators.

A sharing decision block 304 comprises a record of a particular allocation decision. The decision may reference the policy block according to which it was made, hardware configuration according to which the resources to be shared need to be configured, as well as the operators involved.

A revert decision block 306 contains information to roll back a sharing decision (for example once a failure has been resolved). This block references the sharing decision block of the original decision. In the absence of any information in this block a decision may be rolled back by reading the sharing decision block 304 backwards.

In some examples, the distributed ledger 300 may also comprise a hardware configuration block (not shown). If present, this block may contain information about the configuration of the hardware on the site. Such information may include software version, IP login credentials, APN, radio link configuration, QoS, etc. Depending on the sensitivity of this information, some or all of the hardware configuration information may be obtained from the site configuration repository, or repositories.

An example implementation of the methods discussed above is now described in the context of a cloud Radio Access network (RAN) deployment. According to the example deployment, virtual Baseband Processing Units (BBUs) may be shared in the event of a failure affecting an operator. The architecture for the example implementation is illustrated in FIG. 4.

Figure 4:
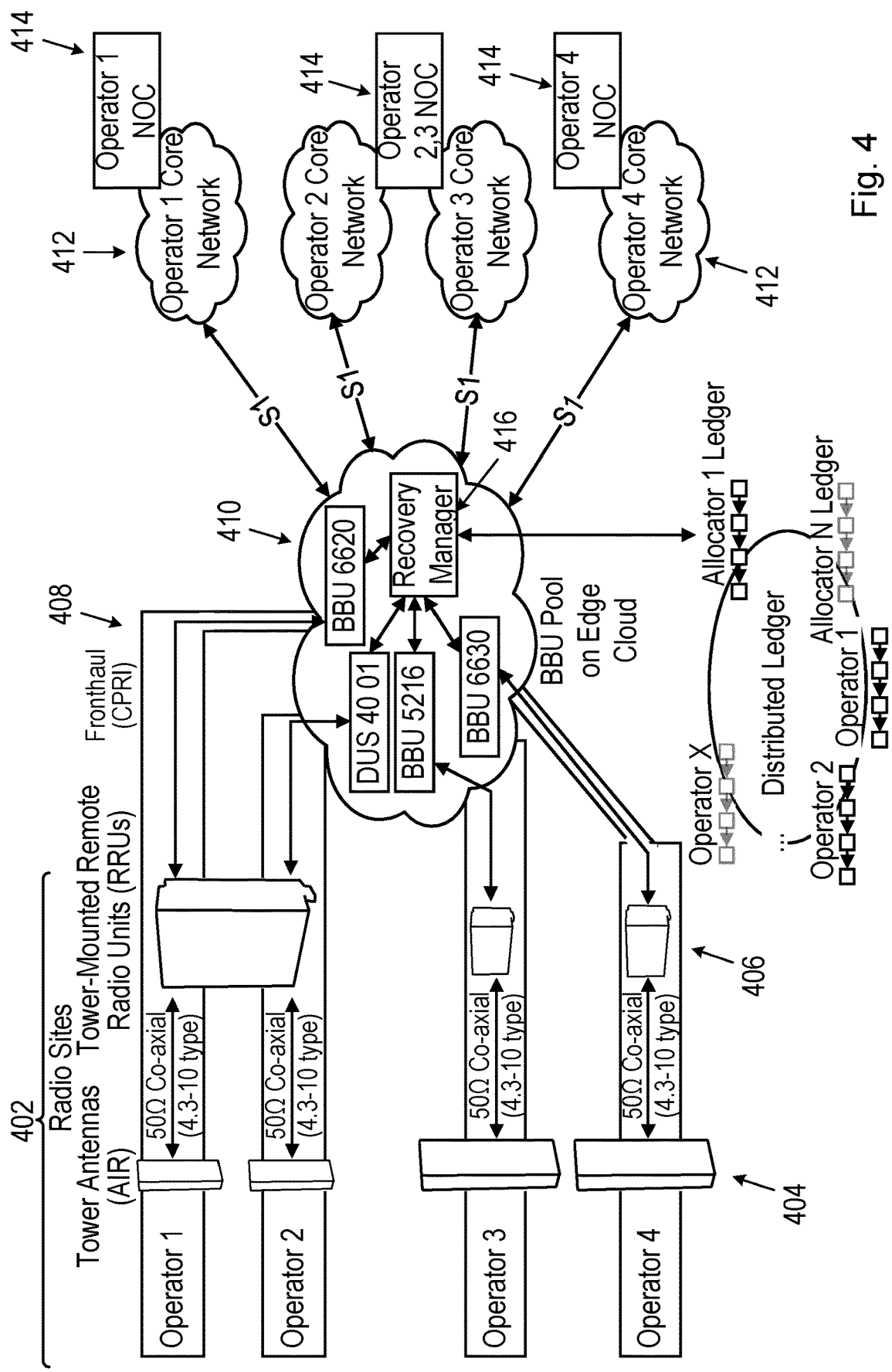
FIG. 4 is a schematic illustration of an example cloud RAN deployment.

FIG. 4 illustrates a plurality of radio sites 402, each comprising an antenna and a tower mounted Remote Radio Unit (RRU) 404. As illustrated in the Figure, one or more operators may share a RRU. Fronthaul connections 408 link the RRUs to a BBU pool on an Edge Cloud 410. The BBU pool is connected to the operator core networks 412 via the S1 interface. Network Operations Centres (NOCs) 414 are in communication with the core networks. The NOCs may be operator specific or a single NOC may manage operations for multiple operators.

Among the main differences between RAN and Cloud RAN is the use of virtual, software based and implemented BBUs. This virtualisation allows a simplification of the radio sites 402, which then only contain Remote Radio Units and antennas. The sites access base band processing by way of a fiber cable in a localized cloud deployment, no more than 20 km from the location of the RRU. The use of virtual BBUs enables the creation of a pool of BBUs which can be allocated dynamically. In a Cloud RAN context, faults reported from the BBUs are sent to a NOC. The NOC analyses these faults and initiates a resolution process.

According to the present example implementation, notifications from a NOC regarding existing or potential issues that may be afflicting a site may prompt resource sharing that is managed by a resource manager. An antenna or RRU experiencing a problem would be notified via a fault message. Sleeping cells may be identified via sites which are being underutilised. One way to alleviate this problem would be to allocate additional virtual BBUs (vBBUs) to healthy cells so that they can handle more traffic while other cells are being reset. Consequently, a request for resource re-allocation may be generated ahead of time which aims at selecting those resources that can be shared. Thereafter the operation of the site that is going to experience an outage is gracefully degraded (in the case of sleeping cells, UEs will handover to other cells) and new resources are re-configured by pulling configuration settings from the operator's repository of settings. New resources are afterwards allocated and are now ready to receive traffic for a given timeframe. As soon as this timeframe expires, telecom network resource allocation is rolled back to its original state.

As discussed above, the reallocation of resources is handled in a resource manager, which in the illustrated implementation is a virtualised component hosted in the localised cloud 410 and referred to in the Figure as a Recovery Manager 416. On receiving a fault report from a NOC, the Recover Manager 416 initiates a reallocation of a baseband or digital unit instance in the BBU pool, and then rolls back this reallocation upon notification from the NOC that the fault has been fixed. The reallocation process includes instantiating a new blueprint of a baseband/digital unit, using configuration information supplied from an operator on the local Infrastructure as a Service (IaaS) cloud platform. Examples of IaaS include Openstack, Docker, VMWare, etc.

Figure 5A:
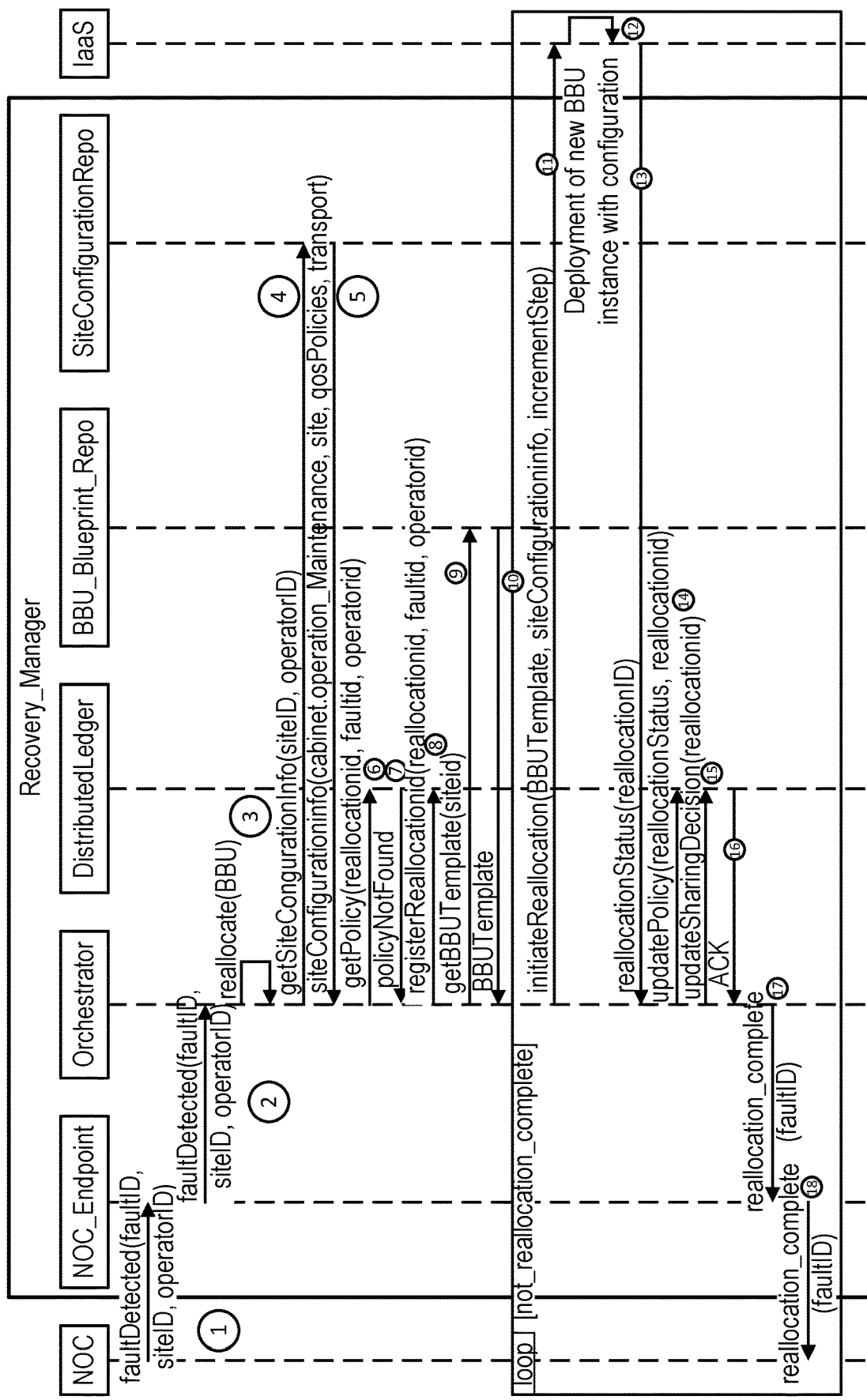
FIG. 5 is a signalling diagram illustrating an example implementation of the methods of FIGS. 1 and/or 2a to 2c.
Figure 5B:
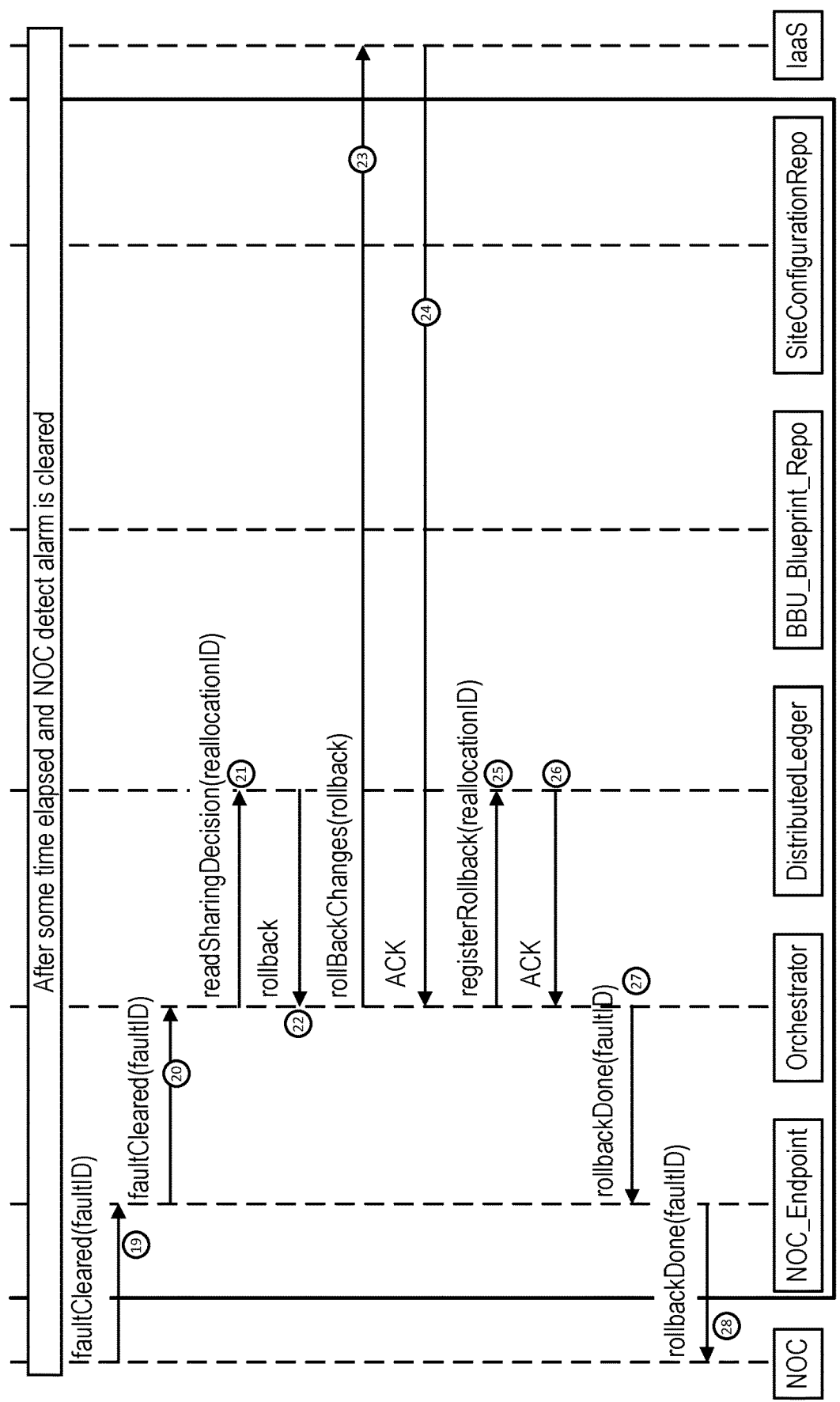

FIG. 5 is a sequence diagram illustrating a scenario in which an example of a method according to the present disclosure is called upon for the purposes of releasing BBUs, previously allocated to Operator B, to Operator A following receipt from a NOC of a report of a failure in Operator A's network. This issue could also be addressed by allocating additional BBUs, assuming there is enough capacity for this to be achieved.

Referring to FIG. 5, a fault report notification is sent from a NOC to a NOC endpoint in message 1, and is then forwarded by the NOC endpoint to an orchestrator of the resource manager in message 2. The fault report includes identifier of the fault, the site and the affected operator. The resource manager then determines at step 3 that the operational requirement to compensate for the impact of the fault on traffic flow in the network is to reallocate a virtual BBU to a healthy cell that will take over the operator's traffic while the fault is being resolved. In messages 4 and 5, the resource manager requests and receives site configuration information from a site configuration repository storing information for the affected operator. In message 6, the resource manager requests from a distributed ledger a policy applicable to this reallocation. The policy request message includes the fault ID and operator ID and also includes a reallocation ID. The reallocation ID is a one-time unique identifier which is meant to pin point the exact reallocation that is about to take place. When used by the getPolicy call of message 6 there is a high chance that it will not yield any results since this is the first time it is generated. In this case, the fault ID and operator ID are used in order to acquire any policies that may have been registered in the past in the distributed ledger for this particular issue, as such policies can be re-used. In the illustrated example, no suitable policy is stored on the distributed ledger, and the distributed ledger therefore returns in message 7 a message indicating that no policy has been found.

In message 8, the resource manager updates the distributed ledger with the created reallocation ID. In message 9, the resource manager requests a blueprint or template for the vBBU to be relocated to the affected operator. This template is returned in message 10. In message 11, the resource manager requests the IaaS platform carry out the reallocation of a BBU. The initiate reallocation message includes the BBU template and site configuration information obtained by the resource manager in earlier message exchanges. At step 12, the IaaS platform reallocates the BBU. This may in practice comprise deploying a new BBU instance with the template and configuration provided but using resources previously allocated to a different operator. In message 13, the IaaS platform updates the resource manager with a reallocation status, quoting the reallocation ID. As discussed above, the reallocation states may indicate that resources have been reallocated exactly as requested, however, the IaaS may not be able to allocate resources exactly as requested, and so may only reallocate a part of the requested resources. In message 14, the resource manager updates the distributed ledger with a policy corresponding to the reallocation. In the present example, a policy is created, as no policy was returned by the distributed ledger in message 7. The resource manager then updates the distributed ledger with the sharing decision in step 15. In step 16, the distributed ledger acknowledges the updates. In message 17, the resource manager confirms to the NOC endpoint that the reallocation is complete, quoting the original fault ID. This reallocation complete message is forwarded by the NOC endpoint to the NOC in message 18.

The site will continue to operate with the reallocated resources while the fault reported in message 1 is addressed. After some time, during which the fault is addressed, the NOC sends t a message quoting the original fault ID and indicating that the fault has been cleared. This message is sent to the NOC endpoint in message 19 and forwarded to the resource manager in message 20. The resource manager then reads the sharing decision from the distributed ledger in message 21 and receives from the distributed ledger a message indicating how to roll back the decision in message 22. In message 23, the resource manager instructs the IaaS platform to roll back the changes made in the earlier reallocation, that this roll back is acknowledged by the IaaS platform in message 24. In message 25, the resource manager updates the distributed ledger with the roll back, quoting the reallocation ID. The distributed ledger acknowledges this update at message 26. In message 27, the resource manager confirms to the NOC endpoint that the reallocation corresponding to the original fault ID has been rolled back, and this message is passed on to the NOC in message 28.

Figure 6:
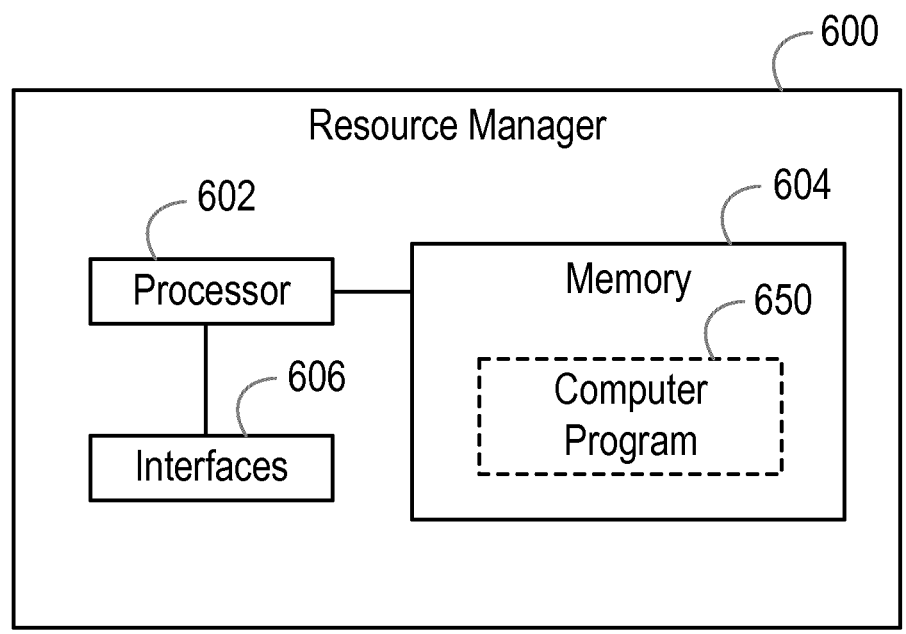
FIG. 6 is a block diagram illustrating functional units in a resource manager.

As discussed above, the methods 100, 200 may be performed by a resource manager, which may be a physical component or a virtualised function. FIG. 6 is a block diagram illustrating an example resource manager 600 which may implement the methods 100, 200 according to examples of the present disclosure, for example on receipt of suitable instructions from a computer program 650. Referring to FIG. 6, the resource manager 600 comprises a processor or processing circuitry 602, a memory 604 and interfaces 606. The memory 604 contains instructions executable by the processor 602 such that the resource manager 600 is operative to conduct some or all of the steps of the method 100 and/or 200. The instructions may also include instructions for executing one or more telecommunications and/or data communications protocols. The instructions may be stored in the form of the computer program 650. In some examples, the processor or processing circuitry 602 may include one or more microprocessors or microcontrollers, as well as other digital hardware, which may include digital signal processors (DSPs), special-purpose digital logic, etc. The processor or processing circuitry 602 may be implemented by any type of integrated circuit, such as an Application Specific Integrated Circuit (ASIC), Field Programmable Gate Array (FPGA) etc. The memory 604 may include one or several types of memory suitable for the processor, such as read-only memory (ROM), random-access memory, cache memory, flash memory devices, optical storage devices, solid state disk, hard disk drive etc.

Figure 7:
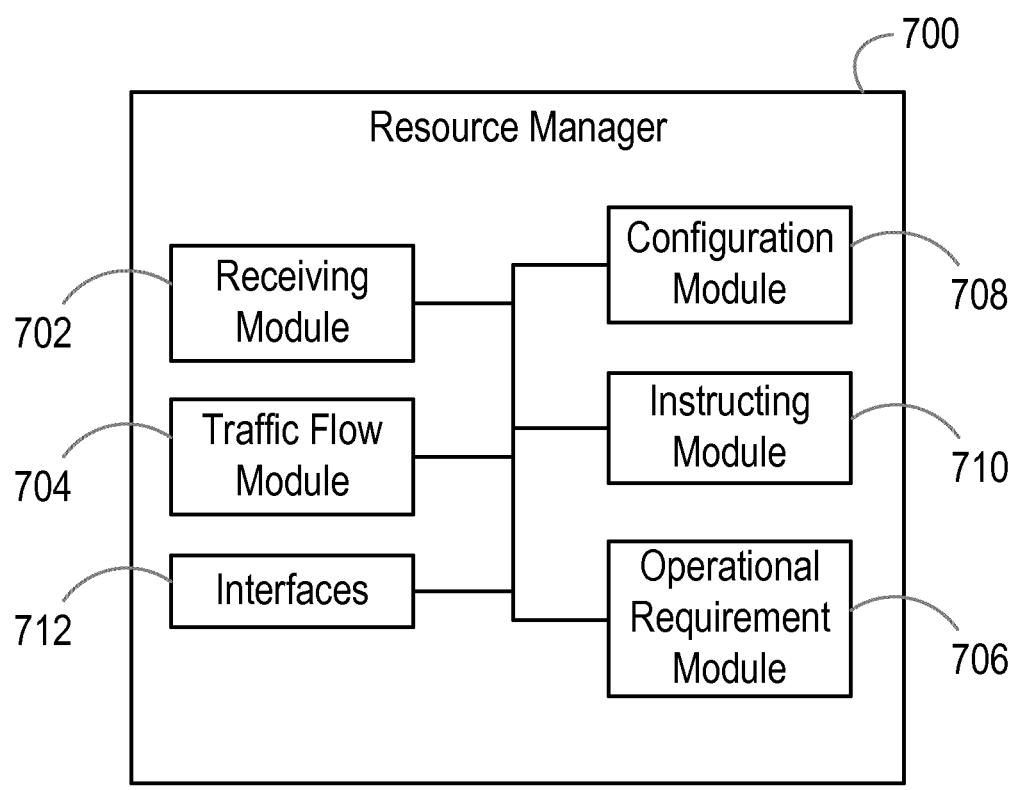
FIG. 7 is a block diagram illustrating functional units in another example of resource manager.

FIG. 7 illustrates functional units in another example of resource manager 700 which may execute examples of the methods 100, 200 of the present disclosure, for example according to computer readable instructions received from a computer program. It will be understood that the units illustrated in FIG. 7 are functional units, and may be realised in any appropriate combination of hardware and/or software. The units may comprise one or more processors and may be integrated to any degree.

Referring to FIG. 7, the resource manager 700 comprises a receiving module 702 for receiving a notification of an event occurring at a network entity, the network entity being associated with the site and with a network operator, wherein the event comprises at least one of a performance event, a fault event or an update event. The resource manager 700 further comprises a traffic flow module 704 for determining an implication of the notified event for traffic flow in the network, and an operational requirement module 706 for determining, on the basis of the implication of the notified event for traffic flow in the network, an operational requirement to compensate for the event. The resource manager 700 further comprises a configuration module 708 for obtaining configuration information for fulfilment of the operational requirement, and an instructing module 710 for instructing an infrastructure manager for the site to allocate network resources in accordance with the obtained configuration information in order to satisfy the operational requirement. The resource manager 700 further comprises interfaces 712.

Aspects of the present disclosure thus provide a resource manager that (re)allocates resources upon a request when a fault occurs, and later rolls back this reallocation upon notification that the fault has been fixed. The resource manager uses a distributed record such as a distributed ledger for storing information about allocated resources and to provide transparency among operators. The dynamic reuse of network resources at a site between different network operators may therefore be facilitated. Reallocation decisions and policies may be stored in the distributed record such that they are accessible to the operators, so allowing for changing and for checking for compliance with agreements concerning resource sharing.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing allocation of network resources at a site in a communication network, the method, performed by a resource manager, comprising:
   receiving a notification of an event occurring at a network entity, the network entity being associated with the site and with a network operator, wherein the event comprises at least one of a performance event, a fault event or an update event;
   determining an implication of the notified event for traffic flow in the network;
   determining, on the basis of the implication of the notified event for traffic flow in the network, an operational requirement to compensate for the event;
   obtaining configuration information for fulfilment of the operational requirement;
   instructing an infrastructure manager for the site to allocate network resources in accordance with the obtained configuration information in order to satisfy the operational requirement; and
   on receipt of confirmation from the infrastructure manager that at least a part of the instructed resources has been allocated, updating a distributed record of network resource allocation with the allocated resources.

2. The method as claimed in claim 1, wherein the distributed record of network resource allocation comprises a distributed persistent data structure.

3. The method as claimed in claim 1, wherein instructing an infrastructure manager for the site to allocate network resources in accordance with the obtained configuration information in order to satisfy the operational requirement comprises instructing the infrastructure manager to make a temporary allocation of network resources.

4. The method as claimed in claim 1, wherein determining, on the basis of the implication of the notified event for traffic flow in the network, an operational requirement to compensate for the event comprises determining a change in physical or virtual network configuration to optimise network performance under traffic flow conditions following the notified event.

5. The method as claimed in claim 4, wherein the change in physical or virtual network configuration to optimise network performance under traffic flow conditions following the notified event comprises a physical or virtual network function to be allocated to the operator associated with the network entity at which the event occurred, and wherein the method further comprises obtaining instructions for configuration of the network function from an operator specific repository.

6. The method as claimed in claim 5, wherein instructing an infrastructure manager for the site to allocate network resources in accordance with the obtained configuration information in order to satisfy the operational requirement comprises including the obtained instructions for configuration with the instruction to the infrastructure manager.

7. The method as claimed in claim 1, wherein obtaining configuration information for fulfilment of the operational requirement comprises querying a site configuration repository for site configuration information applicable to the operational requirement.

8. The method as claimed in claim 7, wherein the network comprises a plurality of site configuration repositories and wherein the method comprises querying a site configuration repository containing information for the network operator associated with the entity at which the notified network event occurred.

9. The method as claimed in claim 1, wherein the configuration information for fulfilment of the operational requirement comprises at least one of:
   site configuration information;
   backhaul information;
   operation and maintenance information;
   hardware configuration;
   information on pre-approved resource sharing between network operators.

10. The method as claimed in claim 1, wherein the operational requirement comprises a physical or virtual network function to be allocated to the operator associated with the network entity at which the event occurred, and wherein instructing an infrastructure manager for the site to allocate network resources in accordance with the obtained configuration information in order to satisfy the operational requirement comprises instructing the infrastructure manager to perform at least one of:
- re-allocating an existing instance of the function to the network operator;
- deploying a new instance of the function to the network operator.

11. The method as claimed in claim 1, wherein the infrastructure manager comprises at least one of:
- an Infrastructure as a Service, IAAS, platform;
- a physical resource orchestration function.

12. The method as claimed in claim 1, further comprising:
- receiving a notification that the event is no longer occurring at the network entity; and
- instructing the infrastructure manager to reverse the allocation of network resources, returning the allocated network resources to their allocation immediately preceding the previous instruction from the resource manager.

13. The method as claimed in claim 1, further comprising:
- querying the distributed record of network resource allocation for a resource sharing policy corresponding to the determined operational requirement, wherein a resource sharing policy comprises an identification of network operators offering and receiving shared resources, an identification of resources shared and a specification of a volume of resources shared.

14. The method as claimed in claim 13, wherein querying the distributed record of network resource allocation for a resource sharing policy corresponding to the determined operational requirement comprises sending a policy request to the distributed record of network resource allocation, the policy request including at least one of an event identifier of the notified event, an operator identifier of the operator associated with the network entity at which the event occurred, and a reallocation identifier corresponding to the specific operational requirement.

15. The method as claimed in claim 14, wherein, if the distributed record of network resource allocation returns a policy, instructing an infrastructure manager for the site to allocate network resources in accordance with the obtained configuration information in order to satisfy the operational requirement comprises instructing the infrastructure manager to allocate network resources in accordance with the policy.

16. The method as claimed in claim 1, further comprising updating a policy record on the distributed record of network resource allocation with a policy comprising the allocated resources and identifiers of the operators offering and receiving the allocated resources.

17. A resource manager for managing allocation of network resources at a site in a communication network, the resource manager comprising a processor and a memory, the memory containing instructions executable by the processor such that the resource manager is operable to:
- receive a notification of an event occurring at a network entity, the network entity being associated with the site and with a network operator, wherein the event comprises at least one of a performance event, a fault event or an update event;
- determine an implication of the notified event for traffic flow in the network;
- determine, on the basis of the implication of the notified event for traffic flow in the network, an operational requirement to compensate for the event;
- obtain configuration information for fulfilment of the operational requirement;
- instruct an infrastructure manager for the site to allocate network resources in accordance with the obtained configuration information in order to satisfy the operational requirement; and
- on receipt of confirmation from the infrastructure manager that at least a part of the instructed resources has been allocated, update a distributed record of network resource allocation with the allocated resources.

* * * * *